(12) United States Patent
Schubert

(10) Patent No.: US 8,308,997 B2
(45) Date of Patent: Nov. 13, 2012

(54) FIRE RESISTANT CELLULOSIC MATERIALS AND METHOD OF MAKING THE SAME

(75) Inventor: David M. Schubert, Lone Tree, CO (US)

(73) Assignee: U.S. Borax Inc., Greenwood Village, CO (US)

( * ) Notice: Subject to any disclaimer, the term of this patent is extended or adjusted under 35 U.S.C. 154(b) by 92 days.

(21) Appl. No.: 12/337,494

(22) Filed: Dec. 17, 2008

(65) Prior Publication Data

US 2009/0156073 A1    Jun. 18, 2009

Related U.S. Application Data

(60) Provisional application No. 61/014,358, filed on Dec. 17, 2007.

(51) Int. Cl.
*C09K 21/00* (2006.01)
*B32B 5/02* (2006.01)

(52) U.S. Cl. ......... 252/608; 252/607; 442/136; 442/140

(58) Field of Classification Search ................. 252/607, 252/608

See application file for complete search history.

(56) References Cited

U.S. PATENT DOCUMENTS

| | | |
|---|---|---|
| 3,629,052 A | 12/1971 | Knoepfler et al. |
| 3,645,814 A | 2/1972 | Knoepfler et al. |
| 3,874,990 A | 4/1975 | Surdyk |
| 4,039,645 A | 8/1977 | Coyle |
| 4,438,028 A | 3/1984 | Schmittmann et al. |
| 4,888,136 A | 12/1989 | Chellapa et al. |
| 5,076,969 A | 12/1991 | Fox |
| 5,151,225 A * | 9/1992 | Herndon et al. ............ 252/607 |
| 5,156,775 A | 10/1992 | Blount |
| 5,182,309 A | 1/1993 | Hutzen |
| 5,308,896 A | 5/1994 | Hansen et al. |
| 5,456,775 A | 10/1995 | Schapira et al. |
| 5,641,561 A | 6/1997 | Hansen et al. |
| 5,788,915 A | 8/1998 | Blount |
| 5,854,309 A | 12/1998 | Blount |
| 6,156,240 A | 12/2000 | Blount |
| 6,235,347 B1 | 5/2001 | Arshinova et al. |
| 6,258,298 B1 | 7/2001 | Blount |
| 6,270,694 B1 | 8/2001 | Blount |
| 6,319,431 B1 | 11/2001 | Basson et al. |
| 6,348,526 B1 | 2/2002 | Blount |

(Continued)

FOREIGN PATENT DOCUMENTS

CN       1898333       1/2007

(Continued)

OTHER PUBLICATIONS

"Borates for Fire Retardancy in Cellulosic Materials", 20 Mule Team, Service Bulletin, Borax, 17 pages.

(Continued)

*Primary Examiner* — Lynda Salvatore
(74) *Attorney, Agent, or Firm* — Sheridan Ross, PC

(57) ABSTRACT

The invention relates to a fire resistant composition and a method of making fire resistant cellulosic materials comprising the fire resistant composition. More specifically, the invention relates to liquid compositions, including liquid compositions comprising urea and a boron-containing compound for imparting fire resistance to cellulosic products. The boron-containing compound typically comprises boric acids; borates (i.e., boric acid salts); boric oxides (i.e., any compound containing boron and oxygen), and mixtures thereof.

7 Claims, 2 Drawing Sheets

U.S. PATENT DOCUMENTS

| | | | |
|---|---|---|---|
| 6,352,786 B2 | 3/2002 | Arshinova et al. | |
| 6,423,251 B1 | 7/2002 | Blount | |
| 6,444,718 B1 * | 9/2002 | Blount | 521/94 |
| 6,454,968 B1 | 9/2002 | Blount | |
| 6,464,903 B1 | 10/2002 | Blount | |
| 6,491,850 B1 | 12/2002 | Blount | |
| 6,517,748 B2 * | 2/2003 | Richards et al. | 252/607 |
| 6,521,339 B1 | 2/2003 | Hansen et al. | |
| 6,620,349 B1 | 9/2003 | Lopez | |
| 6,630,349 B1 | 10/2003 | Rossant et al. | |
| 6,652,633 B2 | 11/2003 | Pasek et al. | |
| 6,981,998 B2 | 1/2006 | Dermeik et al. | |
| 7,018,490 B2 | 3/2006 | Hansen et al. | |
| 7,157,526 B2 | 1/2007 | Nickolaus et al. | |
| 7,335,613 B2 | 2/2008 | Cottrell et al. | |
| 2005/0217537 A1 | 10/2005 | Knipe | |
| 2007/0278463 A1 | 12/2007 | Ratzsch et al. | |

FOREIGN PATENT DOCUMENTS

| | | | |
|---|---|---|---|
| EP | 0 532 357 | * | 9/1992 |
| EP | 0745160 | | 12/1996 |
| EP | 1409213 | | 4/2004 |
| EP | 1486536 | | 12/2004 |
| EP | 1489536 | | 12/2004 |
| WO | WO 02/06021 | | 1/2002 |
| WO | WO 03/048242 | | 6/2003 |

OTHER PUBLICATIONS

"In Situ Leach (ISL) Mining of Uranium", http://www.world-nuclear.org/info/inf27.html, accessed Feb. 18, 2009.

"Polybor: Product Profile", Chemical and Physical Properties, 20 Mule Team, www.borax.com, 2 pages.

"Uranium Mining", Wikipedia, 19 pages, http://en.wikipedia.org/w/index.php?title=Uranium_mining&printable=yes, accessed Feb. 18, 2009.

"Urea-Borate Product Fights Fire, Termites", Flame Retardancy News, Sep. 1, 2002, http://findarticles.com/p/articles/mi_go2349/is_200209/ai_n7198840.

ASTM D-777-97 (2002), "Standard Test Methods for Flammability of Treated Paper and Paperboard", www.astm.org/Standards/D777.htm, 2002, 4 pages.

Summary of "An Environmental Critique of In Situ Leach Mining: The Case Against Uranium Solution Mining", pp. 1-5, http://www.sea-us.org.au/pdfs/isl/isisummary.html, accessed Feb. 18, 2009.

TAPPI T461 cm-00, "Flame Resistance of Treated Paper and Paperboard", www.tappi.org, 2000, 5 pages.

International Search Report for International (PCT) Application No. PCT/US 08/87257, mailed Feb. 5, 2009.

Written Opinion for International (PCT) Application No. PCT/US 08/87257, mailed Feb. 5, 2009.

English translation of Official Action for China Patent Application No. 200880126647.1, issued Nov. 2, 2011 9 pages.

* cited by examiner

FIRE RESISTANT CELLULOSIC MATERIALS AND METHOD OF MAKING THE SAME

CROSS-REFERENCE TO RELATED APPLICATION

This application claims priority under 35 U.S.C. §119(e) from U.S. Provisional Application Ser. No. 61/014,358, filed Dec. 17, 2007, which is incorporated herein by reference in its entirety.

FIELD OF THE INVENTION

The invention relates to a fire resistant composition and a method of making fire resistant cellulosic materials comprising the fire resistant composition. More specifically, the invention relates to liquid compositions, including liquid compositions comprising urea and a boron -containing compound for imparting fire resistance to cellulosic products.

BACKGROUND OF THE INVENTION

The following text should not be construed as an admission of knowledge in the prior art. Furthermore, citation or identification of any document in this application is not an admission that such document is available as prior art to the present invention, or that any reference forms a part of the common general knowledge in the art.

Paper and other cellulosics are widely used commercially. However, these materials suffer from being flammable and can also be susceptible to attack by decay fungi. Application of borates including disodium octaborate tetrahydrate ($Na_2B_8O_{13}.4H_2O$), ammonium pentaborate [$NH_4B_5O_6(OH)_4.4H_2O$] and ammonium tetraborate [$(NH_4)_2B_4O_5.4H_2O$] have long been recommended for use as fire retardant treatments for paper and other cellulosics and have also been used to combat fungi. Despite the general efficacy of borates to reduce flammability of cellulosics, recently developed fire tests are more demanding and often cannot be passed with the application of borates alone. One particular problem with borates is their limited solubility in liquids, which limits the amount of borate that can be applied to a cellulosic material to impart fire retardancy. Typically, the amount of borate applied in a liquid treatment is insufficient to achieve fire retardancy in more aggressive fire tests.

Nothing herein is to be construed as an admission that the present invention is not entitled to antedate a patent, publication or invention by another by virtue of prior invention.

SUMMARY OF INVENTION

It is to be understood that the present invention includes a variety of different versions or embodiments, and this Summary is not meant to be limiting or all-inclusive. This Summary provides some general descriptions of some of the embodiments, but may also include some more specific descriptions of certain embodiments.

An aspect of the present invention comprises various aqueous compositions for imparting fire resistance to a cellulosic material. Other aspects of the present invention comprise articles of commerce having fire resistant properties, comprising a cellulosic material and each of the aqueous compositions described below. The cellulosic material is selected from the group consisting of: papers, cardboards, rayons, cottons, shoddy fabrics, natural fibers, synthetic fibers, linens, wood fibers, plant fibers, and liner boards.

In one embodiment, the aqueous composition comprises from about 0.6 wt % boron to about 14 wt % boron and from about 5 wt % urea to about 60 wt % urea. Preferably, the aqueous composition comprises from about 1.5 wt % boron to about 6 wt % boron. In another embodiment, the aqueous composition comprises from about 10 wt % urea to about 40 wt % urea. In yet an another embodiment, the aqueous composition comprises from about 1.5 wt % boron to about 6 wt % boron and from about 10 wt % urea to about 45 wt % urea, and even more preferred from about 1.5 wt % boron to about 6 wt % boron and from about 15 wt % urea to about 45 wt % urea.

In the present invention, the boron can be derived from one or more of: boric acids; borates (i.e., boric acid salts); and boric oxides (i.e., any compound containing boron and oxygen). In particular embodiments, the boron-containing material is selected from the group consisting of: octaborate ($B_8O_{13}^{2-}$) salts; pentaborates ($B_5O_8^{-}$) salts; tetraborate ($B_4O_5^{2-}$) salts; metaborate ($B_2O_4^{2-}$) salts; and mixtures thereof. In some embodiments, the boron-containing material is selected from the group consisting of: disodium octaborate tetrahydrate ($Na_2B_8O_{13}.4H_2O$); ammonium pentaborate tetrahydrate ($NH_4B_5O_8.4H_2O$); ammonium tetraborate tetrahydrate (($NH_4)_2B_4O_5.4H_2O$); sodium metaborate ($Na_2B_2O_4.4H_2O$); and mixtures thereof.

Commonly, the aqueous composition for imparting fire resistance comprises at least 6 wt % disodium octaborate tetrahydrate and at least 5 wt % urea. In a preferred embodiment, the aqueous composition comprises at least about 10 wt % urea, and in a more embodiment at least about 30 wt % urea. In other embodiments, the aqueous composition comprises borate. In a preferred embodiment, the aqueous composition comprise, from about 2 wt % borate to about 45 wt % borate and from about 5 wt % urea to about 60 wt % urea. In yet other embodiments, the aqueous composition comprises from about 10 wt % urea to about 45 wt % urea, and in preferred embodiments the aqueous composition comprises about 30 wt % urea. In still yet other embodiments, the aqueous composition comprises from about 5 wt % borate to about 20 wt % borate, and in preferred embodiments the aqueous composition comprises about 10 wt % borate.

In some embodiments, the aqueous composition further comprises an optional material selected from the group consisting of: ammonia (including aqueous ammonia); alkali metal salts; alkaline earth salts; transition metal salts; ammonium salts; surfactants; wetting agents; dispersants; stabilizing agents; and mixtures thereof. In a preferred embodiment the optional material comprises ammonium bromide.

Another aspect of the present invention is an article of commerce having fire resistance properties comprising: a cellulosic material; from about 0.4 wt % boron to about 3 wt % boron; and from about 1 wt % urea to about 20 wt % urea. In a preferred embodiment, the article of commerce comprises from about 0.6 wt % boron to about 2.5 wt % boron, more preferred from about 0.9 wt % boron to about 2.2 wt % boron. In another preferred embodiment, the article of commerce comprises from about 2 wt % urea to about 15 wt % urea. 22. In some embodiments, the article of commerce optionally further comprises a material selected from group consisting of: ammonia, aqueous ammonia; alkali metal salts, alkaline earth salts, transition metal salts; ammonium salts; ammonium bromide; surfactants, wetting agents, dispersants; stabilizing agents, anionic surfactants, cationic surfactants, nonionic surfactants, and mixtures thereof. In one embodiment the optional material comprises ammonium bromide.

Additional advantages of the present invention will become readily apparent from the following discussion, particularly when taken together with the accompanying drawings.

DETAILED DESCRIPTION OF THE INVENTION

Figure 1:
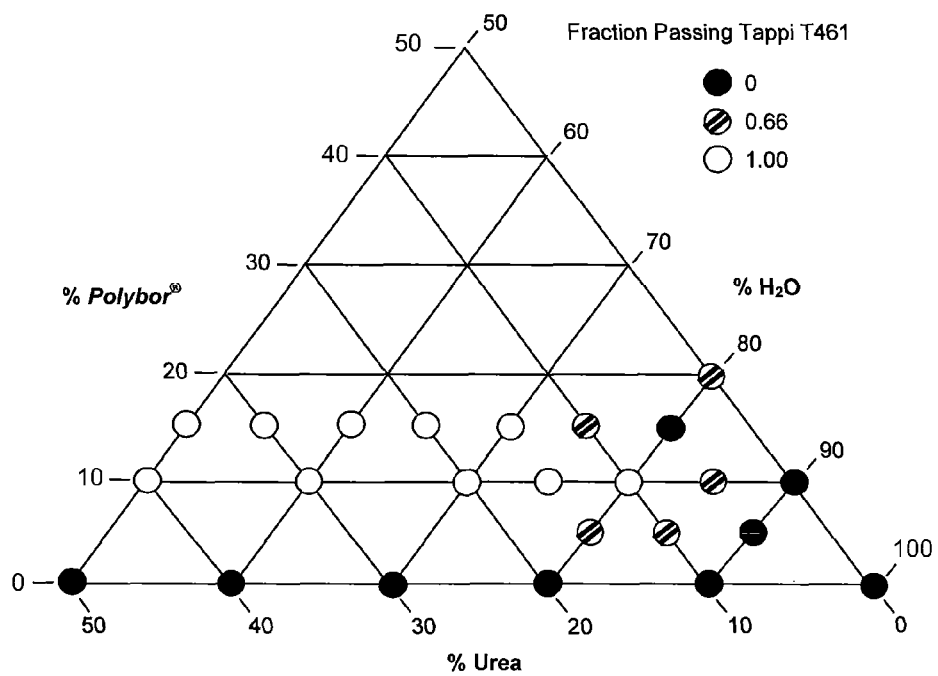
FIG. 1 is a graphical representation of Tappi T461 test results for 20 lb. per 1,000 ft² liner board samples. The labels indicating % POLYBOR®, % Urea, and % $H_2O$ refers to percent composition of the treatment solutions. Estimated additive concentrations on dry liner board samples submitted to the fire test are given in Table 1.

One aspect of the present invention comprises a fire resistant cellulosic material comprising urea and boron. It was surprisingly and unexpectedly found that fire retardancy can be imparted to the cellulosic materials containing urea and boron as described herein. Even more surprisingly, the urea and boron impart sufficient fire retardancy to cellulosic materials to pass more demanding fire tests. The compositions described herein impart high levels of flame retardancy with lower levels of boron than previously disclosed. In addition to the advantage of imparting higher levels of flame retardancy with lower levels of boron, the lower levels boron typically have the advantage of: reducing raw material cost, being more easily formulated and applied, increasing stability, and being less likely to negatively impact feel and/or appearance of the treated cellulosic material.

Typically, the boron is deposited on the cellulosic material in the form of a boron-containing material. The boron can be derived from any boron-containing material. The boron-containing material can include boric acids, borates (i.e., boric acid salts) or boric oxides (i.e., any compound containing boron and oxygen). In particular embodiments, the boron-containing material, without limitation, can be selected from: octaborate ($B_8O_{13}^{2-}$) salts; pentaborates ($B_5O_8^-$) salts; tetraborate ($B_4O_5^{2-}$) salts; ammonium tetraborate tetrahydrate (($NH_4$)$_2B_4O_5$.$4H_2O$); metaborate ($B_2O_4^{2-}$) salts; sodium metaborate ($Na_2B_2O_4$.$4H_2O$); and mixtures thereof. In some embodiments, the boron-containing material, can be selected from: disodium octaborate tetrahydrate ($Na_2B_8O_{13}$.$4H_2O$); ammonium pentaborate tetrahydrate ($NH_4B_5O_8$.$4H_2O$); ammonium tetraborate tetrahydrate (($NH_4$)$_2B_4O_5$.$4H_2O$); sodium metaborate ($Na_2B_2O_4$.$4H_2O$); and mixtures thereof. Disodium octaborate tetrahydrate is marketed by U.S. Borax Inc. under the trade name POLYBOR®.

The fire resistant cellulosic material comprises urea. As used herein urea means urea or urea salts, such as, urea phosphate being an example, without limitation, of a urea salt.

The cellulosic material can be any material comprising natural or synthetic cellulose. Suitable cellulosic materials comprise, without limitation, papers, cardboards, rayons, cottons, shoddy fabrics, natural fibers, synthetic fibers, linens, wood fibers, plant fibers, and liner boards.

In one embodiment, the fire resistant cellulosic materials can have from about 0.4 wt % boron to about 3 wt % boron and from about 1 wt % urea to about 20 wt % urea. In another embodiment, the fire resistant cellulosic material comprises from about 0.6 wt % boron to about 2.5 wt % boron, and in another embodiment from about 0.9 wt % boron to about 2.2 wt % boron. In another embodiment, the fire resistant cellulosic material comprises from about 2 wt % urea to about 15 wt % urea.

Another aspect of the present invention comprises an aqueous composition comprising boron and urea, wherein the aqueous composition imparts fire resistance to cellulosic materials when applied thereto. Fire resistant cellulosic materials are prepared by contacting the aqueous composition containing boron and urea with a cellulosic material. The aqueous compositions can be contacted with the cellulosic material in any conventional manner known in the fire retardant arts, including soaking, spraying, brushing, rolling, pressure treating, surface application, or by adding the composition during manufacture and the like.

In various embodiments, the aqueous composition for imparting fire resistance to a cellulosic material comprises from about 2 wt % borate to about 45 wt % borate; from about 5 wt % borate to about 20 wt %; and about 10 wt % borate. In other embodiments the aqueous composition comprises one of: from about 5 wt % urea to about 60 wt % urea; from about 10 wt % urea to about 45 wt % urea; and about 30 wt % urea. In another embodiment, the aqueous composition for imparting fire resistance to a cellulosic material comprises at least about 6 wt % disodium octaborate tetrahydrate and at least about 5 wt % urea, preferably at least about 10 wt % urea, and more preferably at least about 30 wt % urea.

Boron in the aqueous compositions of the present invention can be derived from any of the boron containing compounds described above. Reference to urea means urea, ($NH_2$)$_2$C=O, or a salt comprising urea, as described above.

It has been surprisingly and unexpectedly found, while not being bound by example and/or theory, that increasing the level of urea added in the aqueous composition typically increases, for the same wt % level of the boron-containing material, the amount of the boron-containing material deposited on a cellulosic material. In other words, the amount of boron-containing material deposited on cellulosic material can be increased by increasing the wt % of urea in the aqueous composition. Typically, synergism is greater for aqueous compositions having higher wt % urea, and more particularly, greater for aqueous compositions having more than 15 wt % urea. Additionally, as the total solids content of the aqueous composition increases, the wt % of urea deposited on the cellulosic material typically decreases. The total solids content of an aqueous composition comprising a boron-containing material and urea is the total wt % of the boron-containing material and urea in the aqueous composition.

This invention further entails aqueous compositions with other additives (such as, without limitation, auxiliary fire resistance additives, surfactants, stabilizers, anti-foaming agents, wetting agents, and such) to achieve fire resistance when applied to paper and other cellulosic materials. In addition, the application of the aqueous composition, with or without the other additives, does not significantly alter and/or negatively impact the look, feel, appearance, odor, and/or stiffness of the cellulosic material.

The practical formulation of the aqueous composition is challenging due to stability issues that arise when urea and a boron-containing material are combined in the presence of water. As used herein, "stable" refers to the ability to form a homogeneous solution and/or dispersion and remain homogenous and/or dispersed (i.e., not precipitating out solids) upon standing at a given temperature. For example, the aqueous composition can be stable after storage at ambient temperature (typically ranging from about 25° C. to about 5° C.) for: at about 1 day to about 7 days; for about 1 week to about 3 weeks; for about 1 month to about 3 months; or for at least about 3 months. In some instances the unstable aqueous composition can be reconstituted to a homogeneous solution and/or dispersion by one or more of heating the solution to a temperature above ambient temperature and/or applying shear force to the aqueous solution (as for example, without limitation, stirring or mixing).

The aqueous compositions can be prepared in various ways, including combining water, urea, and appropriate boron-containing materials, such as, boric acids, borates (i.e., boric acid salts), boron oxides (i.e., any compound containing boron and oxygen), and more particularly, octaborate ($B_8O_{13}^{2-}$) salts, pentaborate ($B_5O_8^-$) salts, tetraborate ($B_4O_5^{2-}$) salts, metaborate ($B_2O_4^{2-}$) salts; and mixtures thereof, and even more particularly, disodium octaborate tetrahydrate ($Na_2B_8O_3.4H_2O$), ammonium pentaborate tetrahydrate ($NH_4B_5O_8.4H_2O$), ammonium tetraborate tetrahydrate (($NH_4)_2B_4O_5.4H_2O$); and sodium metaborate ($Na_2B_2O_4.4H_2O$). The water, urea, and appropriate boron-containing materials can be combined in any order. For example, in one embodiment, the urea and boron-containing material can be combined before mixing with water. The aqueous composition can be formed by adding water to the mixture or alternatively, by adding the mixture to water. Another embodiment for forming the aqueous composition includes adding one of urea and the boron-containing material to water to form an aqueous mixture before adding the other of one of urea and the boron-containing material to the aqueous mixture.

Alternatively, the aqueous composition can be combined with and/or formed with one or more optional other materials. The optional other materials can be selected from: ammonia (including aqueous ammonia); alkali metal salts (such as, without limitation, NaCl, NaBr, KCl, and KBr); alkaline earth salts (such as, without limitation, $MgCl_2$, $MgBr_2$, $CaCl_2$, and $CaBr_2$); transition metal salts (non-limiting examples being $ZnCl_2$, and $ZnBr_2$); ammonium salts (a non-limiting example being $NH_4Br$); surfactants; wetting agents; stabilizing agents; dispersants; and combinations thereof. Commonly, surfactants and wetting agents include anionic, cationic, and non-ionic materials. Those skilled in the art of surfactants will commonly use a single surfactant or a combination of surfactants, depending on the use and degree of surfactancy needed. Anionic surfactants include without limitation materials based on sulfate, sulfonate, carboxylate anions, perfluorooctanoate, perfluorooctanesulfonate, sodium dodecyl sulfate, ammonium lauryl sulfate, alkyl sulfate salts, sodium laureth sulfate, alkyl benzene sulfonate, soaps, and fatty acid salts. Cationic surfactants include without limitation materials based on quaternary ammonium cations, cetyl trimethylammonium bromide, other alkyltrimethylammonium salts, cetylpyridinium chloride, polyethoxylated tallow amine, benzalkonium chloride, benzethonium chloride, zwitterionic, dodecyl betaine, cocamidopropyl betaine, and coco ampho glycinate. Nonionic surfactants include without limitation alkyl poly(ethylene oxide), alkylphenol poly(ethylene oxide), copolymers of poly(ethylene oxide) and poly(propylene oxide), alkyl polyglucosides, octyl glucoside, decyl maltoside, fatty alcohols, cetyl alcohol, oleyl alcohol, cocamide MEA, cocamide DEA, polysorbates, Tween 20, Tween 80, and dodecyl dimethylamine oxide.

In some instances the reagents described will not produce stable aqueous compositions when mixed in all ratios and concentrations. For example, an aqueous composition containing 10 wt % $Na_2B_8O_{13}.4H_2O$, 4.75 wt % NaBr, and urea does not remain a homogeneous solution and precipitates solids after several days at room temperature (that is, at about 25° C.). In another instance, a mixture of 10 wt % $Na_2B_8O_{13}.4H_2O$ and 4.75 wt % $NH_4Br$ remains a homogeneous solution and does not precipitate solids after several days at room temperature. Additionally, stable aqueous compositions can be prepared with ammonium pentaborate tetrahydrate ($NH_4B_5O_8.4H_2O$) and NaBr.

Fire resistance can be determined by methods known to those skilled in the art. For example, an open flame char test is used to determine the flame resistance of the treated fibrous material and generally follows the procedure outlined in TAPPI (Technical Association of the Pulp and Paper Industry) T-461 cm-00 ©2000 by TAPPI entitled "Flammability of Treated Paper and Paperboard" and in ASTM D777-97 (2002) entitled "Flammability of Treated Paper and Paperboard" ASTM International, West Conshohocken, Pa. The disclosure of each of TAPPI T-461 and ASTM D777-97 (2002) is incorporated by reference herein in its entirety.

The T-461 flammability test is a qualitative and quantitative measure flame resistance of paper and paperboard, more specifically a measure of the resistance of a flame to spread and/or ignite treated paper and paperboard after treatment with a fire resistant composition. The flammability test generally includes a method of: applying the fire resistant composition to paper having a thickness of less than 1.6 mm, mounting the treated paper in a fire-proof test cabinet; applying a flame to the treated paper; and determining flaming time, glowing time, and char length.

EXAMPLES

Example 1

This example illustrates one method treating a type of liner board stock with various aqueous compositions for imparting fire resistance to cellulosic materials.

The substrate to be treated was commercial Kraft liner board stock having a weight of approximately 20 lbs per 1,000 square feet. Pieces of this substrate were cut into 90 mm×220 mm samples suitable for submission to the Tappi T461 cm-00, Type 1 fire test, which requires an exposed area of 70 mm×210 mm once the sample is placed into a sample holder. The samples were weighed and initial weights recorded, giving an average sample weight of 2.02 g+0.14 g per sample. Treatment solutions containing POLYBOR® (0-20 wt. %), urea (0-50 wt. %), and the remainder water were prepared. These samples numbered and treated on both sides with treatment solutions using a rod coater fitted with a #4 rod. A rod coater is a devise that spreads an even layer of solution onto the surface of the sample. Following each coat, the samples were immediately weighed and the weights of applied solution, determined by weight difference, were recorded. The average total weight of solution applied to each sample was 1.04 g±0.22 g, giving an average solution treatment level of 33.3 wt. %. Samples treated in this fashion were allowed to dry in air and were then conditioned at 70° F. and 50% relative humidity for at least 48 hours. The look and feel and the treated samples were not ostensibly altered compared with the untreated substrate. Three replicate conditioned pieces of treated paper for each treatment solution were submitted to the Tappi T461 test. Passing performance in this test was defined as follows: 1) samples self extinguish; 2) glowing times are less than 10 seconds; and 3) char lengths are less than 100 mm. Results of these tests are listed in Table 1 and are shown in FIG. 1. Similar results were obtained using chip board as a substrate.

TABLE 1

Treatment levels and Tappi T461 test results
for 20 lb. per 1,000 ft² liner board samples.

| Sample ID | wt % $B_2O_3$ | wt. % Urea | Estimated Ave. wt % $B_2O_3$ on Dry Sample | Estimated Ave. wt % Urea on Dry Sample | Estimated Ave. wt % Applied Solids on Dry Sample | Fraction of Samples Passing Tappi T461 |
|---|---|---|---|---|---|---|
| A1  | 0     | 0  | 0           | 0            | 0            | 0    |
| A2  | 0     | 10 | 0           | 4.64 ± 0.31  | 4.64 ± 0.31  | 0    |
| A3  | 0     | 20 | 0           | 9.16 ± 0.48  | 9.16 ± 0.48  | 0    |
| A4  | 0     | 30 | 0           | 10.47 ± 0.81 | 10.47 ± 0.81 | 0    |
| A5  | 0     | 40 | 0           | 19.90 ± 0.81 | 19.90 ± 0.81 | 0    |
| A6  | 0     | 50 | 0           | 23.56 ± 0.15 | 23.56 ± 0.15 | 0    |
| A7  | 3.38  | 5  | 3.48 ± 0.86 | 3.48 ± 0.86  | 6.95 ± 1.72  | 0    |
| A8  | 3.38  | 10 | 2.04 ± 0.37 | 4.08 ± 0.74  | 6.12 ± 1.11  | 0.66 |
| A9  | 3.38  | 15 | 3.11 ± 0.54 | 9.33 ± 1.62  | 12.43 ± 2.16 | 0.66 |
| A10 | 6.75  | 5  | 3.48 ± 0.17 | 1.74 ± 0.08  | 5.22 ± 0.25  | 0.66 |
| A11 | 6.75  | 10 | 4.61 ± 0.46 | 4.61 ± 0.46  | 9.21 ± 0.93  | 1.0  |
| A12 | 6.75  | 15 | 4.47 ± 0.22 | 6.70 ± 0.33  | 11.17 ± 0.55 | 1.0  |
| A13 | 6.75  | 20 | 3.90 ± 0.40 | 8.17 ± 0.98  | 11.70 ± 1.20 | 1.0  |
| A14 | 6.75  | 30 | 4.21 ± 0.36 | 12.43 ± 0.98 | 16.85 ± 1.46 | 1.0  |
| A15 | 6.75  | 40 | 3.86 ± 0.10 | 15.46 ± 0.42 | 19.32 ± 0.52 | 1.0  |
| A16 | 10.13 | 5  | 6.08 ± 0.24 | 2.03 ± 0.08  | 8.11 ± 0.32  | 0    |
| A17 | 10.13 | 10 | 5.75 ± 0.27 | 3.84 ± 0.18  | 9.59 ± 0.45  | 0.66 |
| A18 | 10.13 | 15 | 6.35 ± 0.65 | 6.35 ± 0.65  | 12.82 ± 1.30 | 1.0  |
| A19 | 10.13 | 20 | 5.96 ± 0.05 | 7.95 ± 0.07  | 13.91 ± 0.12 | 1.0  |
| A20 | 10.13 | 25 | 6.18 ± 0.40 | 10.29 ± 0.67 | 16.47 ± 1.07 | 1.0  |
| A21 | 10.13 | 30 | 8.43 ± 0.88 | 8.43 ± 0.88  | 16.86 ± 1.75 | 1.0  |
| A22 | 10.13 | 35 | 6.86 ± 0.12 | 6.86 ± 0.12  | 13.72 ± 0.25 | 1.0  |
| A23 | 13.50 | 20 | 5.64 ± 0.48 | 5.64 ± 0.48  | 11.28 ± 0.96 | 0.66 |

The data show that the aqueous compositions containing boron and urea provide substantial fire resistance when applied to a cellulosic material.

Example 2

This Example illustrates one method treating another type of liner board stock with various aqueous compositions for imparting fire resistance to cellulosic materials.

Figure 2:
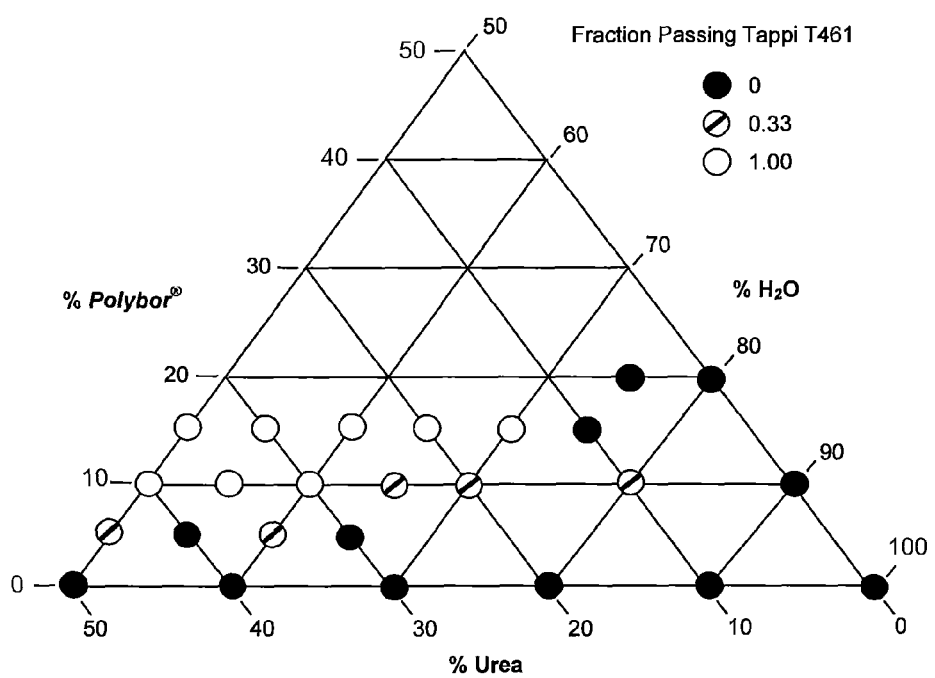
FIG. 2 is a graphical representation of Tappi T461 test results for 35 lb. per 1,000 ft² liner board samples. The labels indicating % POLYBOR®, % Urea, and % $H_2O$ refers to percent composition of the treatment solutions. Estimated additive concentrations on dry liner board samples submitted to the fire test are given in Table 2.

The substrate to be treated was commercial Kraft liner board stock having a weight of approximately 35 lbs per 1,000 square feet. Pieces of this substrate were cut into samples suitable for submission to the Tappi T461 fire test, as described in Example 1. The samples had an average initial weight of 3.62 g+0.26 g. Treatment solutions containing POLYBOR® (0-20 wt. %), urea (0-45 wt. %), and the remainder water were prepared. The samples were numbered and treated on both sides with treatment solutions using a rod coater fitted with a #4 rod. Following each coat, the samples were immediately weighed and weights of applied solution, determined by difference, were recorded. The average total weight of solution applied to each sample was 1.21 g±0.20 g, giving an average solution treatment level of 25.0 wt. %. The pieces were allowed to dry in air and then conditioned at 70° F. and 50% relative humidity for at least 48 hours. The look and feel and the treated samples were not ostensibly altered compared with the untreated substrate. Three replicates conditioned samples of each treatment were submitted to the Tappi T461 test. Results of these tests are listed in Table 2 and are shown in FIG. 2. Similar results were obtained using chip board as a substrate.

TABLE 2

Treatment levels and Tappi T461 test results
for 35 lb. per 1,000 ft² liner board samples.

| Sample ID | wt % $B_2O_3$ | wt. % Urea | Estimated Ave. wt % $B_2O_3$ on Dry Sample | Estimated Ave. wt % Urea on Dry Sample | Estimated Ave. wt % Applied Solids on Dry Sample | Fraction of Samples Passing Tappi T461 |
|---|---|---|---|---|---|---|
| B1  | 0    | 0  | 0           | 0            | 0            | 0    |
| B2  | 0    | 20 | 0           | 6.38 ± 0.80  | 6.38 ± 0.80  | 0    |
| B3  | 0    | 30 | 0           | 12.84 ± 1.38 | 12.84 ± 1.38 | 0    |
| B4  | 0    | 40 | 0           | 12.23 ± 0.73 | 12.23 ± 0.73 | 0    |
| B5  | 0    | 50 | 0           | 14.13 ± 0.40 | 14.13 ± 0.40 | 0    |
| B6  | 3.38 | 30 | 1.40 ± 0.05 | 8.42 ± 0.29  | 9.83 ± 0.34  | 0    |
| B7  | 3.38 | 35 | 1.46 ± 0.05 | 10.19 ± 0.33 | 11.65 ± 0.38 | 0.33 |
| B8  | 3.38 | 40 | 1.44 ± 0.10 | 11.55 ± 0.80 | 12.99 ± 0.90 | 0    |
| B9  | 3.38 | 45 | 1.49 ± 0.06 | 13.42 ± 0.57 | 14.91 ± 0.64 | 0.33 |
| B10 | 6.75 | 10 | 4.43 ± 0.52 | 4.43 ± 0.52  | 9.69 ± 1.37  | 0.33 |
| B11 | 6.75 | 20 | 2.70 ± 0.05 | 5.40 ± 0.11  | 8.10 ± 0.16  | 0.33 |
| B12 | 6.75 | 25 | 2.85 ± 0.32 | 7.13 ± 0.79  | 9.99 ± 1.11  | 0.33 |
| B13 | 6.75 | 30 | 2.81 ± 0.10 | 8.44 ± 0.31  | 11.26 ± 0.41 | 1.0  |
| B14 | 6.75 | 35 | 3.41 ± 0.02 | 11.95 ± 0.08 | 15.36 ± 0.10 | 1.0  |
| B15 | 6.75 | 40 | 2.77 ± 0.04 | 11.07 ± 0.16 | 13.84 ± 0.20 | 1.0  |

TABLE 2-continued

Treatment levels and Tappi T461 test results for 35 lb. per 1,000 ft² liner board samples.

| Sample ID | wt % $B_2O_3$ | wt. % Urea | Estimated Ave. wt % $B_2O_3$ on Dry Sample | Estimated Ave. wt % Urea on Dry Sample | Estimated Ave. wt % Applied Solids on Dry Sample | Fraction of Samples Passing Tappi T461 |
|---|---|---|---|---|---|---|
| B16 | 10.13 | 10 | 4.10 ± 0.20 | 2.74 ± 0.13 | 6.84 ± 0.34 | 0 |
| B17 | 10.13 | 15 | 4.44 ± 0.11 | 4.44 ± 0.11 | 8.89 ± 0.22 | 1.0 |
| B18 | 10.13 | 20 | 4.25 ± 0.11 | 5.67 ± 0.15 | 9.92 ± 0.26 | 1.0 |
| B19 | 10.13 | 25 | 4.42 ± 0.26 | 7.36 ± 0.43 | 11.78 ± 0.70 | 1.0 |
| B20 | 10.13 | 30 | 4.11 ± 0.05 | 8.22 ± 0.10 | 12.33 ± 0.16 | 1.0 |
| B21 | 10.13 | 35 | 4.66 ± 0.33 | 10.37 ± 0.78 | 15.52 ± 1.11 | 1.0 |
| B22 | 13.50 | 0 | 6.85 ± 0.57 | 0 | 6.85 ± 0.57 | 0 |
| B23 | 13.50 | 5 | 5.83 ± 0.54 | 1.46 ± 0.14 | 7.29 ± 0.68 | 0 |

The data show that the aqueous compositions containing boron and urea provide substantial fire resistance when applied to a cellulosic material.

The test results of Examples 1 and 2 demonstrate that the application of the aqueous composition to the cellulosic material resulted in a superior level of fire resistance. Additionally, the test results show that the level of fire resistance achieved by aqueous composition was superior to that which could be achieved with any of the single ingredients alone. For example, significantly better fire performance was achieved in the Tappi T 461 test using treatment with this compared with equivalent separate treatments with aqueous solutions of either 10% POLYBOR® or 40% urea alone.

Example 3

This Example illustrates one method treating liner board stock with various aqueous compositions having an optional other material, in this case ammonium bromide, for imparting fire resistance to cellulosic materials.

The substrate to be treated was commercial Kraft liner board stock having a weight of approximately 42 lbs per 1,000 square feet. Pieces of this substrate were cut into 90 mm×220 mm samples suitable for submission to the Tappi T461 fire test, as described in Example 1. The samples were weighed and initial weights recorded, giving an average sample weight of 3.91 g±0.03 g. Treatment solutions containing POLYBOR® (0-15 wt. %), urea (0-30 wt. %), ammonium bromide (0-4.75%), and the remainder water were prepared. The samples were then treated on both sides with treatment solutions using a rod coater fitted with a #4 rod. Following each coat, the samples were immediately weighed and weights of applied solution, determined by weight difference, were recorded. The average total weight of solution applied to each sample was 1.25 g±0.08 g, giving an average treatment level of 24.2 wt. %. The samples were allowed to dry in air and then conditioned at 70° F. and 50% relative humidity for at least 48 hours. The look and feel and the treated samples were not ostensibly altered compared with the untreated substrate. Three replicates conditioned sample of each treatment were submitted to the Tappi T461 test. Results of these tests are listed in Table 3A and 3B.

TABLE 3A

Treatment levels and Tappi T461 test results for 42 lb. per 1,000 ft² liner board samples.

| Sample ID | wt % $B_2O_3$ | wt. % Urea | wt % $NH_4$ | wt % Br |
|---|---|---|---|---|
| C1 | 0 | 0 | 0 | 0 |
| C2 | 10.13 | 20 | 0 | 0 |
| C3 | 10.13 | 30 | 0 | 0 |
| C4 | 10.13 | 30 | 0.87 | 3.87 |

TABLE 3B

Treatment levels and Tappi T461 test results for 42 lb. per 1,000 ft² liner board samples.

| Sample ID | Estimated Ave. wt % Polybor on Dry Sample | Estimated Ave. wt % Urea on Dry Sample | Estimated Ave. wt % $NH_4Br$ on Dry Sample | Estimated Ave. wt % Applied Solids on Dry Sample | Fraction of Samples Passing Tappi T461 |
|---|---|---|---|---|---|
| C1 | 0 | 0 | 0 | 0 | 0 |
| C2 | 4.12 ± 0.17 | 5.49 ± 0.23 | 0 | 9.60 ± 0.40 | 0.33 |
| C3 | 4.27 ± 0.15 | 8.54 ± 0.36 | 0 | 12.81 ± 0.55 | 0.33 |
| C4 | 4.14 ± 0.08 | 8.27 ± 0.15 | 0.68 ± 0.01 | 13.58 ± 0.25 | 1.0 |

In these tests, it was found that the composition resulted in a fire performance that was superior than could be achieved with any of the single ingredients alone. For example, significantly better fire performance was achieved using treatment with this composition compared with equivalent separate treatments with aqueous solutions of either 10% POLYBOR®, 40% urea, or 4.75% ammonium bromide.

Although the addition of ammonium bromide to cellulosic materials is typically associated with significant smoke production and afterglow, it was observed that the application of ammonium bromide as part of this composition resulted in far less smoke production and afterglow.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An aqueous composition for imparting fire resistance to cellulosic materials, comprising from about 1.5 wt % boron to about 3 wt % boron, wherein the boron is derived from disodium octaborate tetrahydrate ($Na_2B_8O_{13} \cdot 4H_2O$) and at least about 10wt % urea [$(H_2N)_2CO$].

2. The composition of claim 1, wherein the composition comprises at least about 15 wt % urea.

3. The composition of claim 1, wherein the composition comprises at least about 30 wt % urea.

4. The composition of claim 1, wherein the cellulosic material is selected from the group consisting of papers, cardboards, rayons, cottons, shoddy fabrics, natural fibers, synthetic fibers, linens, wood fibers, plant fibers, and liner boards.

5. An article of commerce having fire resistant properties comprising a cellulosic material and the composition as claimed in claim 1.

6. The composition of claim 1, further comprising an optional material selected from the group consisting of: ammonia; alkali metal salts; alkaline earth salts; transition metal salts; ammonium salts; surfactants; wetting agents; dispersants; stabilizing agents; and mixtures thereof.

7. The composition of claim 6, wherein the optional material is at least one of an alkali metal salt, alkaline earth salt or ammonium salt.

\* \* \* \* \*